(12) United States Patent
Minami

(10) Patent No.: US 7,756,111 B2
(45) Date of Patent: Jul. 13, 2010

(54) IP TELEPHONE ACCESS SYSTEM, CUSTOMER'S TERMINATING DEVICE THEREOF AND IP TELEPHONE ACCESS METHOD

(75) Inventor: Hidetaka Minami, Tokyo (JP)

(73) Assignee: NEC Corporation, Tokyo (JP)

( * ) Notice: Subject to any disclaimer, the term of this patent is extended or adjusted under 35 U.S.C. 154(b) by 1422 days.

(21) Appl. No.: 11/156,674

(22) Filed: Jun. 21, 2005

(65) Prior Publication Data

US 2005/0286500 A1    Dec. 29, 2005

(30) Foreign Application Priority Data

Jun. 23, 2004    (JP)    ............... 2004-184368

(51) Int. Cl.
*H04L 12/66* (2006.01)
*G06F 15/16* (2006.01)

(52) U.S. Cl. .................. 370/352; 709/203

(58) Field of Classification Search .......... 379/237, 379/238, 392, 395.31, 395.32, 352–356, 379/389; 709/203, 225
See application file for complete search history.

(56) References Cited

U.S. PATENT DOCUMENTS

2002/0009073 A1 *  1/2002  Furukawa et al. ........... 370/352
2003/0177216 A1 *  9/2003  Sutherland et al. .......... 709/223
2004/0052216 A1 *  3/2004  Roh ........................... 370/252
2004/0210646 A1 * 10/2004  Sushima et al. ............. 709/220

FOREIGN PATENT DOCUMENTS

| JP | 2001-197097 (A) | 7/2001 |
| JP | 2003-46524 (A) | 2/2003 |
| JP | 2003-78538 (A) | 3/2003 |
| JP | 2003-152890 (A) | 5/2003 |
| JP | 2004-96720 (A) | 3/2004 |
| JP | 2004-134893 (A) | 4/2004 |

* cited by examiner

*Primary Examiner*—Fan Tsang
*Assistant Examiner*—Solomon Bezuayehu
(74) *Attorney, Agent, or Firm*—Foley & Lardner LLP

(57) ABSTRACT

An IP telephone access system preventing the use of the 0AB-J number beyond the geographically identified area transfers an existing fixed telephone economically to an IP telephone without changing the telephone number. There is provided an address management table, in the ONU, coordinating the LLID and the address of the IP telephone terminal, an ID management table of the LLID of the ONUs included in the OLTs, and a subscriber's management table, in the IP network, coordinating the OLT-ID, the LLID, the IP address and the subscriber's number. The ONUs extract and store IP packets transmitted from the IP telephone to a server, and then, collate the IP packets with IP addresses transmitted and received, and in the case that these IP addresses are mismatched, transmit the abnormality notification to the server.

25 Claims, 16 Drawing Sheets

F I G. 6
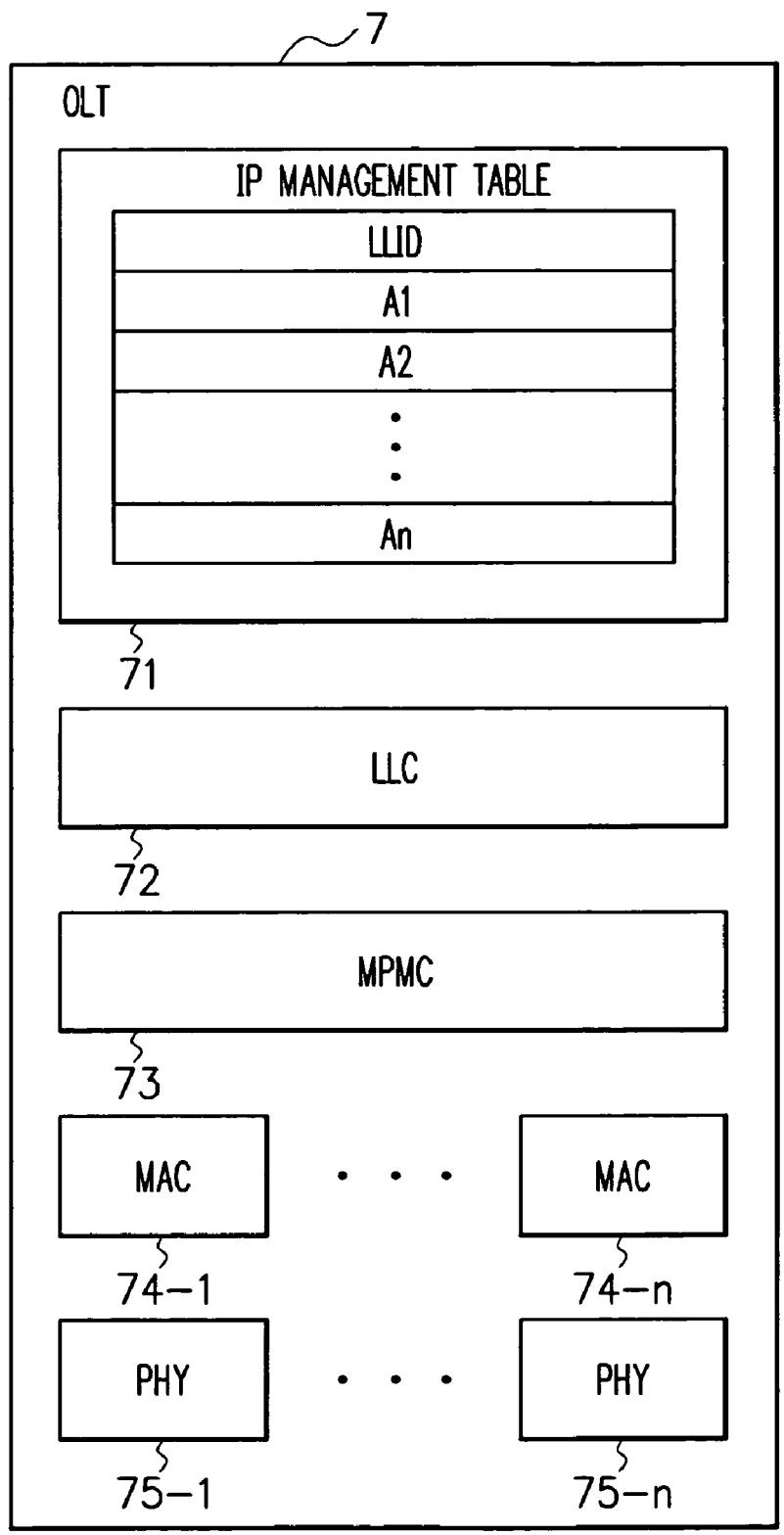

F I G. 15
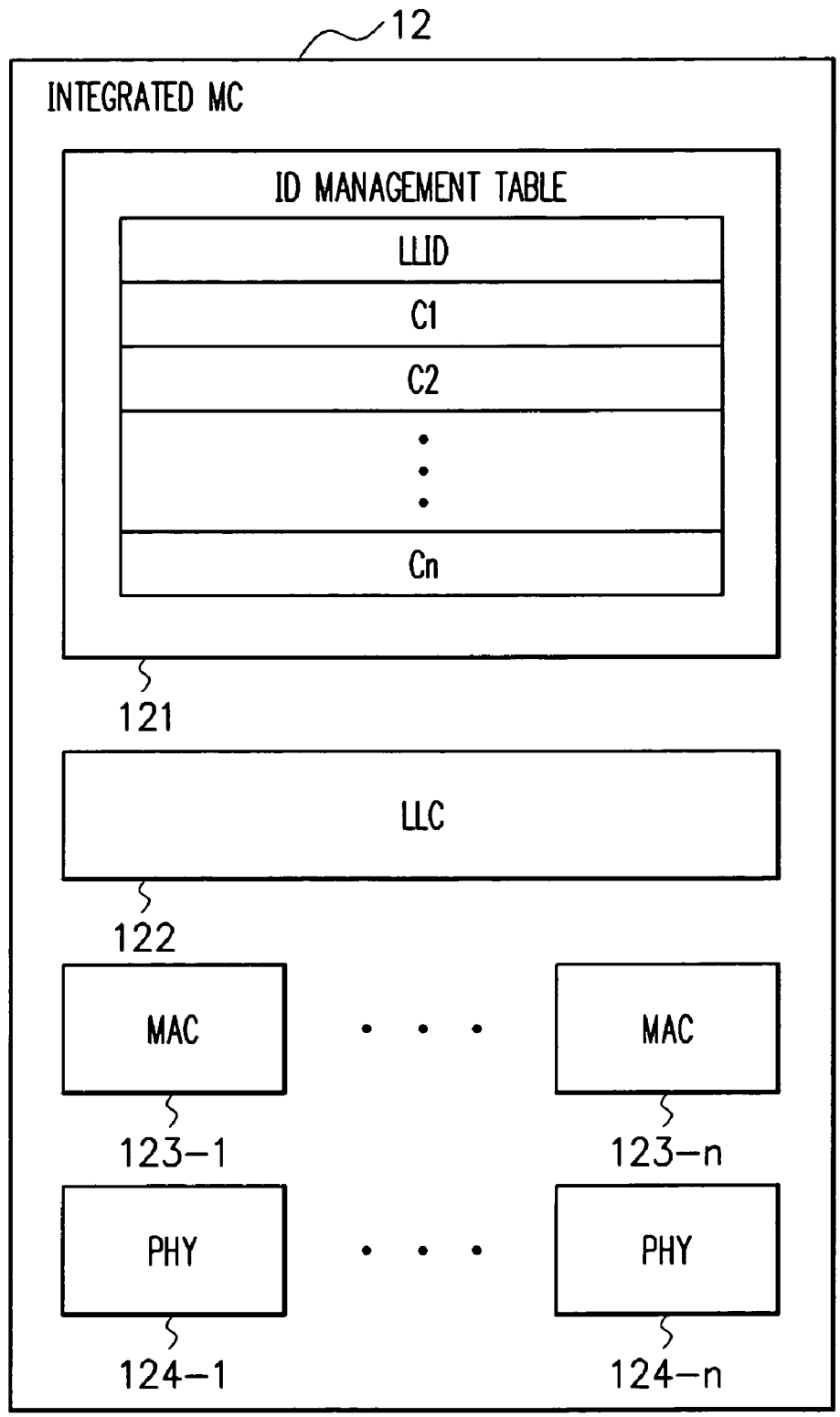

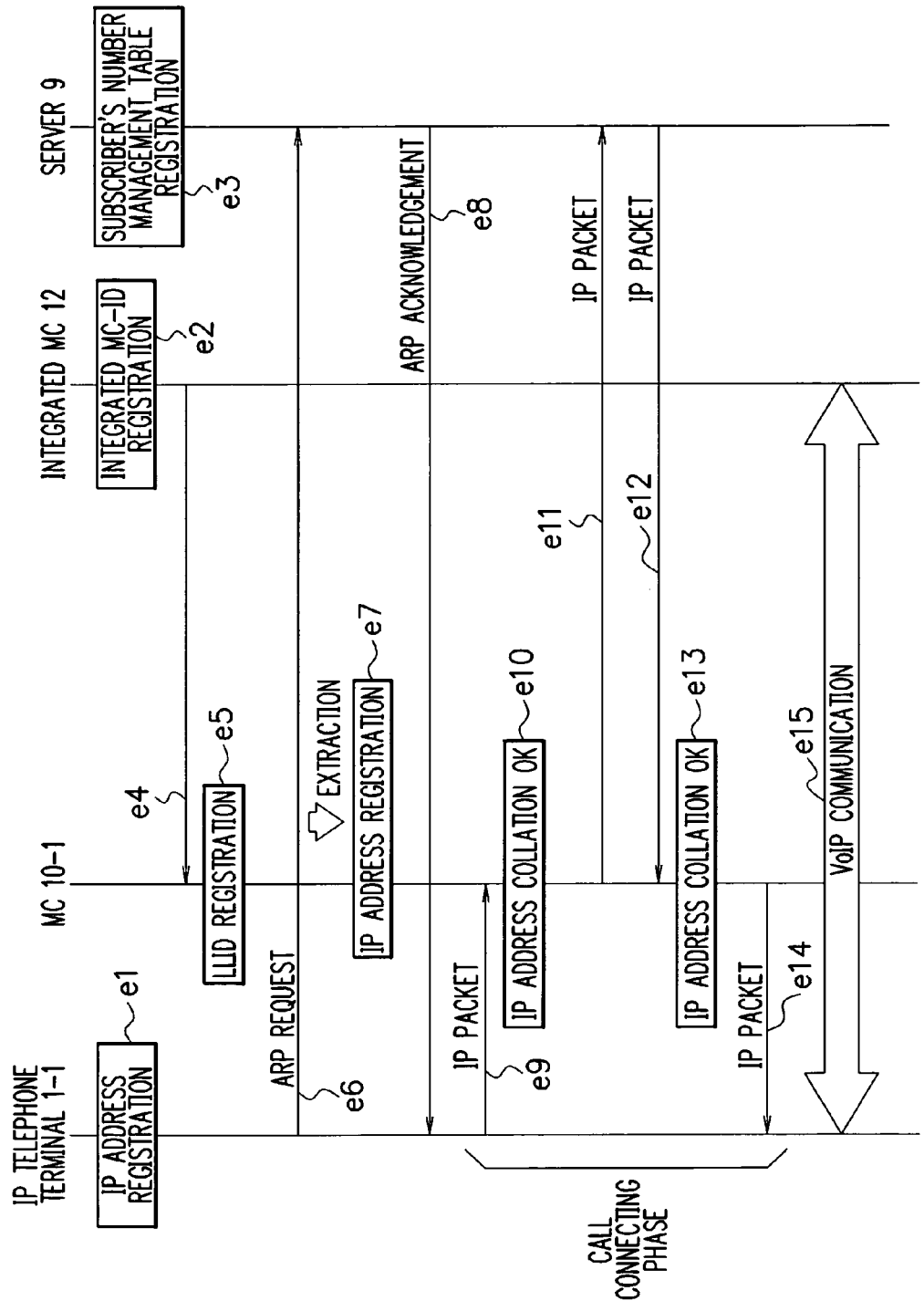

IP TELEPHONE ACCESS SYSTEM, CUSTOMER'S TERMINATING DEVICE THEREOF AND IP TELEPHONE ACCESS METHOD

BACKGROUND OF THE INVENTION

1. Field of the Invention

The present invention relates to an IP (Internet Protocol) telephone access system especially to an IP telephone access system applied to a fixed telephone service, a customer's terminating device and an IP telephone access method.

2. Description of the Prior Art

Preferably, the conventional telephone number system being the fixed telephone number (0AB-J number) is also used for an IP telephone by using a fixed telephone service. That is because the phone number of the fixed telephone (0AB-J number) infiltrates deeply in the life of people such that it is possible to specify the place of dispatch of an urgent message, and it is possible to identify the area of the phone because of the geographically identified characteristic.

Further, that is because the existing fixed telephone (analog telephone or ISDN (Integrated Services Digital Network) telephone) can be replaced to the IP telephone without changing the subscriber's number which is used for the fixed telephone.

On the other hand, it is necessary for the fixed telephone to prevent the use of the phone number (0AB-J number) beyond the geographically identified area. In other words, it is necessary for the fixed telephone to prevent the use of the phone number of the fixed telephone in Osaka after having been transferred from Tokyo. For instance, Japanese Patent application laid open No. 2003-324486 discloses, as an IP telephone access system for the conventional fixed telephone service, the art which realizes the transfer of a telephone without changing its telephone number.

A description will be given of the structure of a conventional communication network system with reference to FIG. 1. Referring to FIG. 1, in the conventional communication network system, there is provided an exchange (a) 51 and an exchange (b) 52 on a common channel signaling network 57 and a software switch (a) 60 and a software switch (b) 61 on an IP network 66.

The exchange (a) 51 includes a fixed telephone terminal (a) 53 and a fixed telephone terminal (b) 54, and the exchange (b) 52 includes a fixed telephone terminal (c) 55 and a fixed telephone terminal (d) 56.

The software switch (a) 60 includes an IP telephone terminal (a) 62 and an IP telephone terminal (b) 63, and the software switch (b) 61 includes an IP telephone terminal (c) 64 and an IP telephone terminal (d) 65.

There are provided a Media Gateway Controller (hereinafter referred to as MGC) (a) 58 and an MGC (b) 59 on the boundary between the common channel signaling network 57 and the IP network 66. The MGC (a) 58 and the MGC (b) 59 convert a call connecting signal of the common channel signaling network 57 to that of the IP network 66 or convert the call connecting signal of the IP network 66 to that of the common channel signaling network 57.

A description will be given of the operation of the transfer of a telephone without changing its telephone number with reference to FIG. 2. Referring to FIG. 2, an exchange (a) 111 has MTP=a as its MTP (Message Transfer Part) address on the common channel signaling network and has a fixed telephone terminal (a) 114 having its telephone number 03-1111-0001. An exchange (b) 112 has MTP=b as its MTP address and included a fixed telephone terminal (b) 115 having had its telephone number 03-2222-0002 before having been transferred.

An MGC 116 has MTP=c as its MTP address and 10.10.10.1 as its IP address on the IP network. A software switch 118 has 100.100.100.1 as its IP address and includes an IP telephone terminal (a) 120 having 100.100.100.3 as its IP address and an IP telephone terminal (b) 121 having 100.100.100.2 as its IP address after being transferred.

In the case that the fixed telephone terminal (b) 115 having its telephone number 03-2222-0002 is transferred to the IP telephone terminal (b) 121 having its IP address 100.100.100.2, it is necessary that the transfer of the fixed telephone terminal (b) 115 and the forwarding address thereof have been set in the exchange (b) 112 including the fixed telephone terminal (b) 115.

In a subscriber's number management table 113 in the exchange (b) 112, the state corresponding to the subscriber's number 03-2222-0002 is set at "transfer" and its forwarding MTP address is set at MTP=c. In an "incoming number"-"account" management table 117 in the MGC 116, the account corresponding to the incoming number 03-2222-0002 is set at BBB@domainA. In an account management table 119 in the software switch 118, the IP address 100.100.100.2 corresponding to the account BBB is set.

In this state, when a phone call is made to 03-2222-0002 from the fixed telephone terminal (a) 114, a call connecting signal is transferred to the exchange (b) 112 via the exchange (a) 111. In the subscriber's number management table 113 in the exchange (b) 112, the forwarding address of 03-2222-0002 is set at the MTP address being MTP=c, and thus, the call connecting signal is transferred to the MGC 116 having the MTP address being MTP=c. Then, the "incoming number"-"account" management table 117 in the MGC 116 transfers the call connecting signal to the software switch 118 including the account BBB@domainA.

In the software switch 118, the account management table 119 transfers the call connecting signal to the IP telephone terminal (b) 121 having the IP address 100.100.100.2 corresponding to the account BBB, and therefore the call connection becomes possible. In this way, even when the fixed telephone terminal (b) 115 is transferred to the IP telephone terminal (b) 121, communication can be established with the old subscriber's number 03-2222-0002.

In the above described conventional communication network system, the exchange has the management table having the subscriber's number and the forwarding address, and the media gateway controller has the management table having the incoming number and the account. With these two management tables, the account management table in the software switch coordinates the subscriber's number and its IP address and transfers the call for the subscriber to its IP address. Therefore, after having completed the operation of the transfer of a telephone without changing the telephone number, the conventional communication network system still needs the exchange and the media gateway controller, and also needs the management table in the software switch for coordinating the account and its IP address, and thus, the operation becomes wasteful and complicated.

Moreover, in the conventional communication network system, for newly receiving an IP telephone service, in the case of using the fixed telephone number (0AB-J number), the exchange and the media gateway controller are necessary and also the management table in the software switch is necessary for coordinating an account and its IP address from the same reason as above, and thus, the operation becomes wasteful and complicated.

SUMMARY OF THE INVENTION

It is therefore an object of the present invention, in order to overcome the above mentioned problems, to provide an IP telephone access system, a customer's terminating device thereof and an IP telephone access method which prevent the use of the fixed telephone number (0AB-J number) beyond the geographically identified area and economically transfer an existing fixed telephone (analog telephone, ISDN telephone) to an IP telephone without changing subscriber's telephone number.

An IP telephone access system of the present invention which includes an IP telephone terminal, a customer's terminating device including the IP telephone terminal, and an intra-office terminating device including the customer's terminating device, comprises:

an address management table, in the customer's terminating device, for coordinating a logical link identifier of each customer's terminating device and an IP address of the IP telephone terminal;

an ID management table, in the intra-office terminating device, for registering the logical link identifier of each customer's terminating device included in the intra-office terminating device;

a server, in an IP network in which information between the IP telephone terminal and the server is transferred by IP packets, accessible from the intra-office terminating device; and a subscriber's number management table, in the server, for coordinating the identifier of the intra-office terminating device, the logical link identifier of the customer's terminating device, the IP address of the IP telephone terminal and the subscriber's number;

wherein the IP packets are detected by the address management table, the ID management table and the subscriber's number management table.

Another IP telephone access system of the present invention which includes an IP telephone terminal, an MC (Media Converter) including the IP telephone terminal, and an integrated MC including the MC, comprises:

an address management table, in the MC, for coordinating a logical link identifier of each MC and an IP address of the IP telephone terminal;

an ID management table, in the integrated MC, for registering the logical link identifier of each MC included in the integrated MC;

a server, in an IP network in which information between the IP telephone terminal and the server is transferred by IP packets, accessible from the integrated MC; and a subscriber's number management table, in the server, for coordinating the identifier of the integrated MC, the logical link identifier of the MC, the IP address of the IP telephone terminal and the subscriber's number;

wherein the IP packets are detected by the address management table, the ID management table and the subscriber's number management table.

A customer's terminating device of the present invention including an IP telephone terminal and included in an intra-office terminating device, comprises:

an address management table for coordinating a logical link identifier of its own and an IP address of the IP telephone terminal; and the steps of:

coordinating, when a call connecting phase starts between the IP telephone terminal and a server placed in an IP network in which information is transferred between the IP telephone terminal and the server and having a subscriber's number management table which coordinates a logical link identifier in the customer's terminating device and accessible from the intra-office terminating device, the IP address of the IP telephone terminal and the subscriber's number, IP address extracted from the IP packets transmitted and received between the IP telephone terminal and the server and the IP address in the address management table; and transmitting an abnormality notification to the server when the collation results in mismatched.

An IP telephone access method of the present invention is applied to the system which includes an IP telephone terminal, a customer's terminating device including the IP telephone terminal, and an intra-office terminating device including the customer's terminating device, comprising:

an address management table, in the customer's terminating device, for coordinating a logical link identifier of each customer's terminating device and an IP address of the IP telephone terminal;

an ID management table, in the intra-office terminating device, for registering the logical link identifier included in the customer's terminating device included in the intra-office terminating device;

a subscriber's management table for coordinating the identifier in the intra-office terminating device, the logical link identifier in the customer's terminating device, the IP address of the IP telephone terminal and the subscriber's number in the server accessible from the customer's terminating device and placed in the IP network transferring information by IP packets between the IP telephone terminal and the server; and the step of verifying the IP packets by using the address management table in the customer's terminating device.

Another IP telephone access method of the present invention is applied to a system which comprises an IP telephone terminal and an MC including the IP telephone terminal and an integrated MC including the MC, comprising:

an address management table, in the MC, for coordinating a logical link identifier of each MC and an IP address of the IP telephone terminal;

an ID management table, in the integrated MC, for registering the logical link identifier of the MC included in the integrated MC;

a subscriber's number management table for coordinating the identifier of the MC, the logical link identifier in the MC, the IP address of the IP telephone terminal and the subscriber's number in the server accessible from the integrated MC and placed in the IP network in which information is transferred by IP packets between the IP telephone terminal and the server; and the step of verifying the IP packets by using the address management table in the MC.

In other words, the IP telephone access system of the present invention is for fixed telephone service, comprising:

an address management table, in an ONU (Optical Network Unit), for coordinating an LLID (Logical Link Identifier) and the IP address;

an ID management table, in an OLT (Optical Line Terminal), of the LLID of the ONU included in the OLT; and a subscriber's number management table, in a server in the IP network, for coordinating an OLT-ID (Optical Line Terminal Identifier), the LLID, the IP address and the subscriber's number.

The IP telephone access system of the present invention, in order to form the address management table in the ONU, performs the processes of:

extracting the IP address from the IP packets transmitted from the IP telephone terminal to the server to store it;

collating, in the ONU, the transmitted or received IP address with extracted IP address; and transmitting, from the ONU, an abnormality notification to the server when the result of the collation is mismatched.

In the IP telephone access system of the present invention, because of the extraction from the IP packets transmitted from the IP telephone terminal to the server, it is possible to form the address management table by automatically storing the IP address of the IP telephone terminal at the time of initial setting of the ONU.

The IP telephone access system of the present invention, by referring to the address management table in the ONU, collates the IP address transmitted from the IP telephone terminal with the IP address stored in the ONU and the communication is not established when these addresses are mismatched. Therefore, according to the IP telephone access system of the present invention, it is possible to prevent the use of the IP telephone terminal beyond the geographically identified area.

Further, according to the IP telephone access system of the present invention, the LLID to be included in the OLT and the LLID transmitted from the ONU are collated by the ID management table in the OLT, and therefore, when an ONU used in an geographically identified area is tried to be used in another geographically identified area, the collation of the LLID is mismatched, and thus, the communication is not established. Therefore, according to the IP telephone access system of the present invention, the use of the ONU beyond the geographically identified area is prevented as is the case with the IP telephone terminal.

As above, in the IP telephone access system of the present invention, it is possible to prevent the use of the fixed telephone number (0AB-J number) beyond the geographically identified area, and apply an IP telephone terminal to the fixed telephone service economically, and also operate the IP telephone terminal easily.

Moreover, according to the IP telephone access system of the present invention, because it is possible to apply the fixed telephone number (0AB-J number) to the IP telephone terminal, it is possible to transfer from the existing fixed telephone (analog telephone or ISDN telephone) to an IP telephone without changing the telephone number and the operation thereof becomes easier.

BRIEF DESCRIPTION OF THE DRAWINGS

The above and further objects and novel features of the invention will be more fully understood from the following detailed description when the same is read in connection with the accompanying drawings in which:

FIG. 6 is a diagram showing the structure of the ID management table in the OLT 7 in FIG. 3;

FIG. 15 is a block diagram showing the structure of the integrated MC 12 in FIG. 12; and FIG. 16 is a sequence chart showing an operation of the IP telephone access system according to the second embodiment of the present invention.

DETAILED DESCRIPTION OF THE PREFERRED EMBODIMENTS

A description will be given of preferred embodiments of the present invention with reference to drawings.

Figure 1:
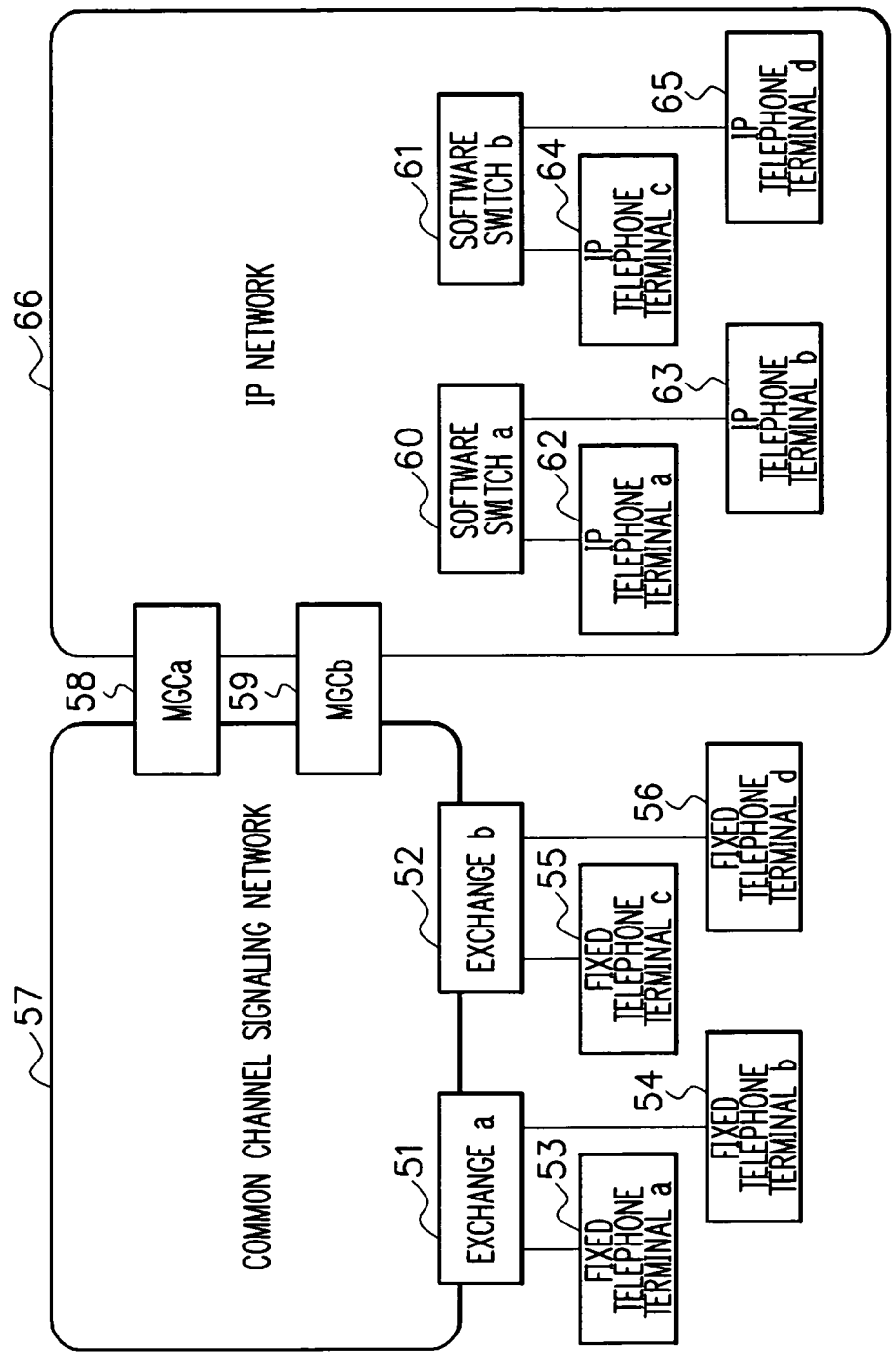
FIG. 1 is a block diagram showing the structure of a communication network system of the conventional IP telephone access system for fixed telephone service.
Figure 2:
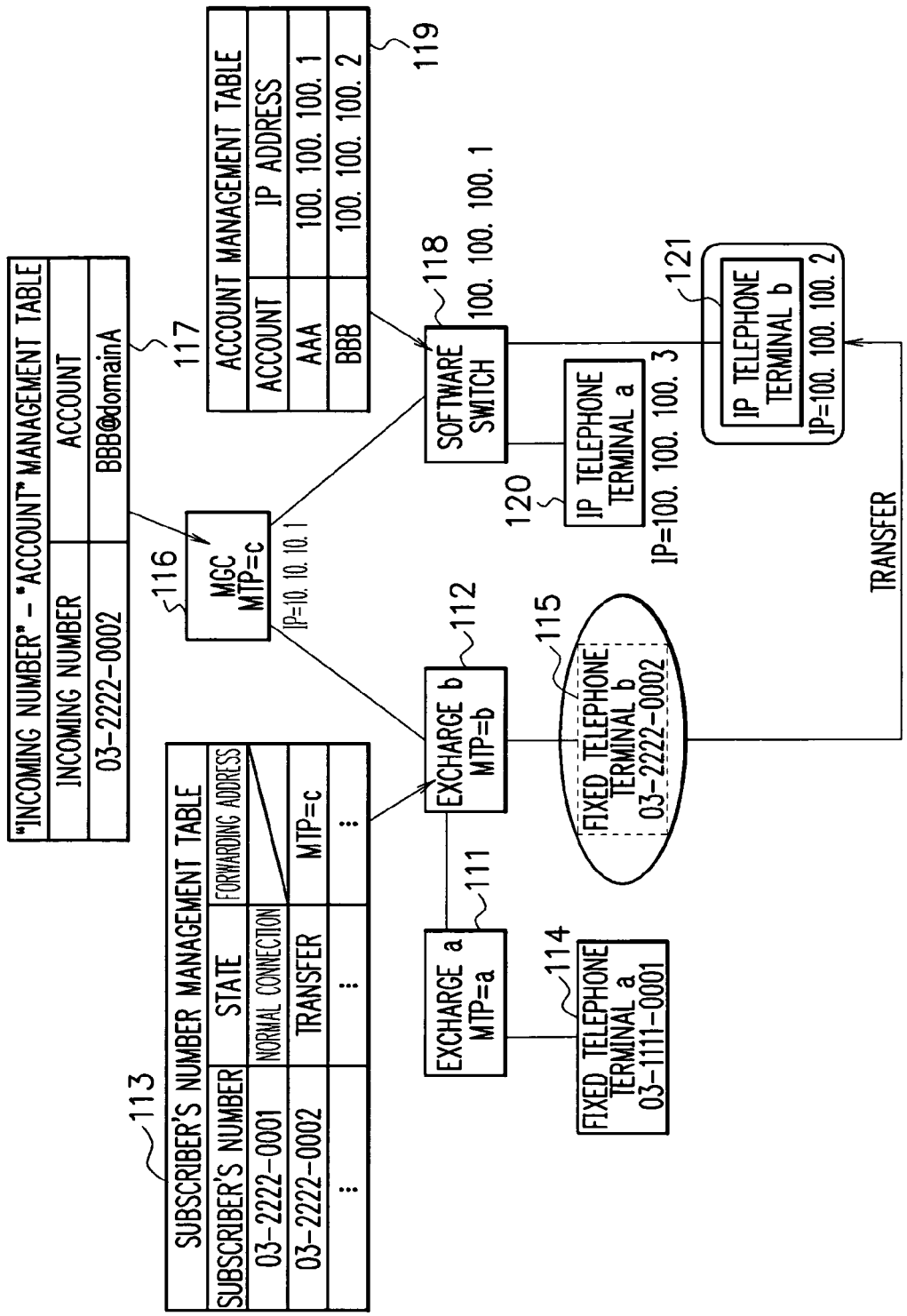
FIG. 2 is a block diagram showing the operation with the structure of a conventional IP telephone access system for fixed telephone service.
Figure 3:
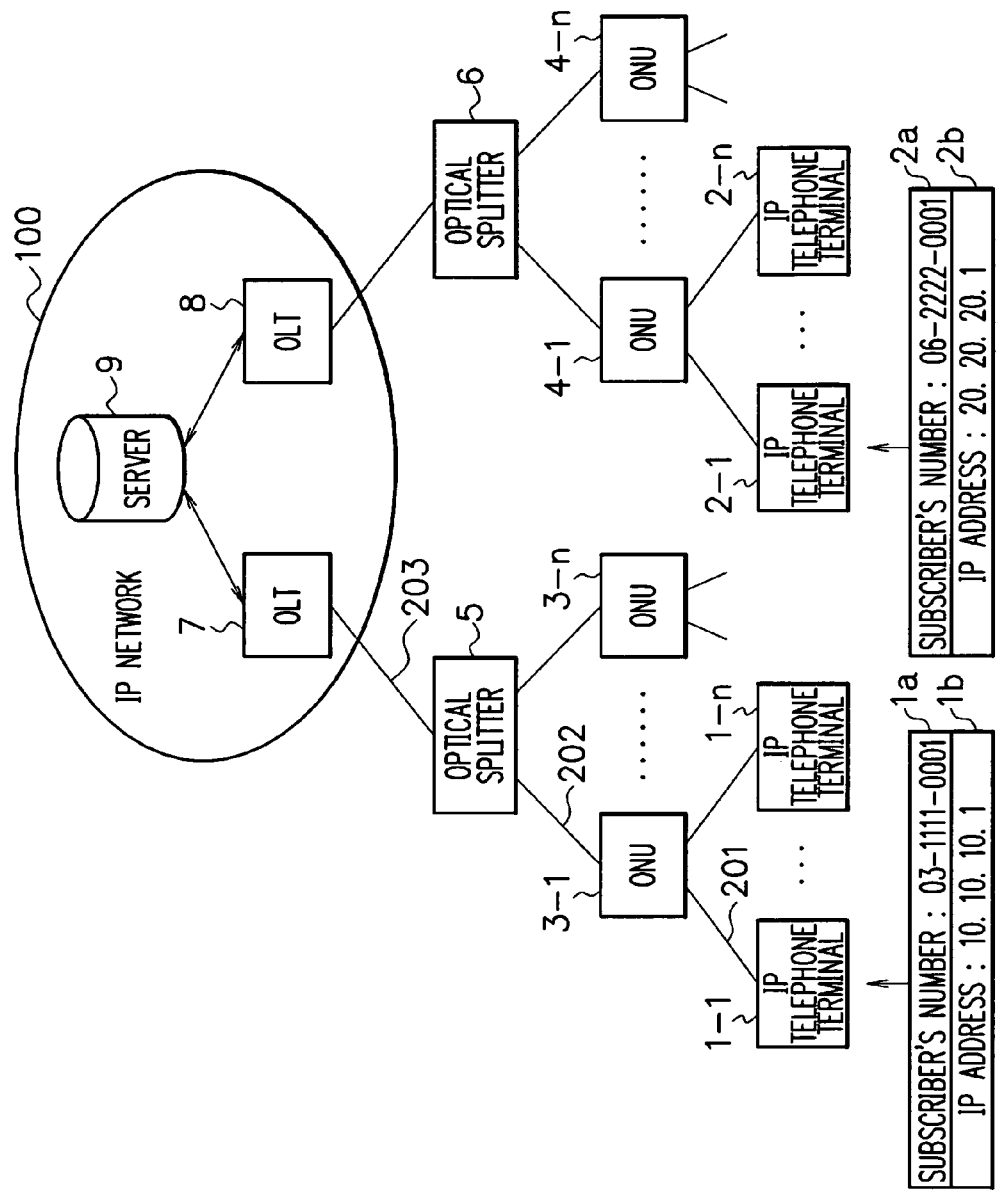
FIG. 3 is a block diagram showing the structure of an IP telephone access system according to the first embodiment of the present invention.

FIG. 3 is a block diagram showing the structure of an IP telephone access system according to the first embodiment of the present invention. Referring to FIG. 3, the IP telephone access system of this embodiment comprises IP telephone terminals 1-1 to 1-$n$ and 2-1 to 2-$n$, ONUs (Optical Network Unit: customer's terminating device) 3-1 to 3-$n$ and 4-1 to 4-$n$, optical splitters 5 and 6, OLTs (Optical Line Terminal: intra-office terminating device) 7 and 8, and a server 9. The OLTs 7 and 8 and the server 9 form an IP network 100.

The IP telephone terminals 1-1 to 1-$n$ and 2-1 to 2-$n$ communicate by sending and receiving the voice over IP packets. A subscriber's number 03-1111-0001 1$a$ is a telephone number allocated to the IP telephone terminal 1-1, and an IP address 10.10.10.1 1$b$ is allocated to the IP telephone terminal 1-1.

A UTP (Unshielded Twist Pair cable) cable 201 connects the IP telephone terminal 1-1 and the ONU 3-1, and the ONUs 3-1 to 3-$n$ form a PON (Passive Optical Network) together with the OLT 7.

An optical cable 202 connects the ONU 3-1 and the optical splitter 5. The optical splitter 5 is a passive element which branches optical signals from the OLT 7 to the ONUs 3-1 to 3-$n$ and gathers optical signals from the ONUs 3-1 to 3-$n$ to the OLT 7.

An optical cable 203 connects the optical splitter 5 and the OLT 7. The OLT 7 forms the PON together with the ONUs 3-1 to 3-$n$. The OLT is placed at an entrance inside the IP network 100. The IP network 100 is an IP packet transfer network which transfers data, voice, and images over packets. The server 9 performs call control between the IP telephone terminals 1-1 to 1-$n$ and the IP telephone terminals 2-1 to 2-$n$ via the OLTs 7 and 8.

The IP telephone terminal 2-1 is connected to the ONU 4-1, and the ONUs 4-1 to 4-$n$ and the OLT 8 form a PON. A subscriber's number 06-2222-0001 2a is allocated to the IP telephone terminal 2-1, and an IP address 20.20.20.1 2b is allocated to the IP telephone terminal 2-1.

Figure 4:
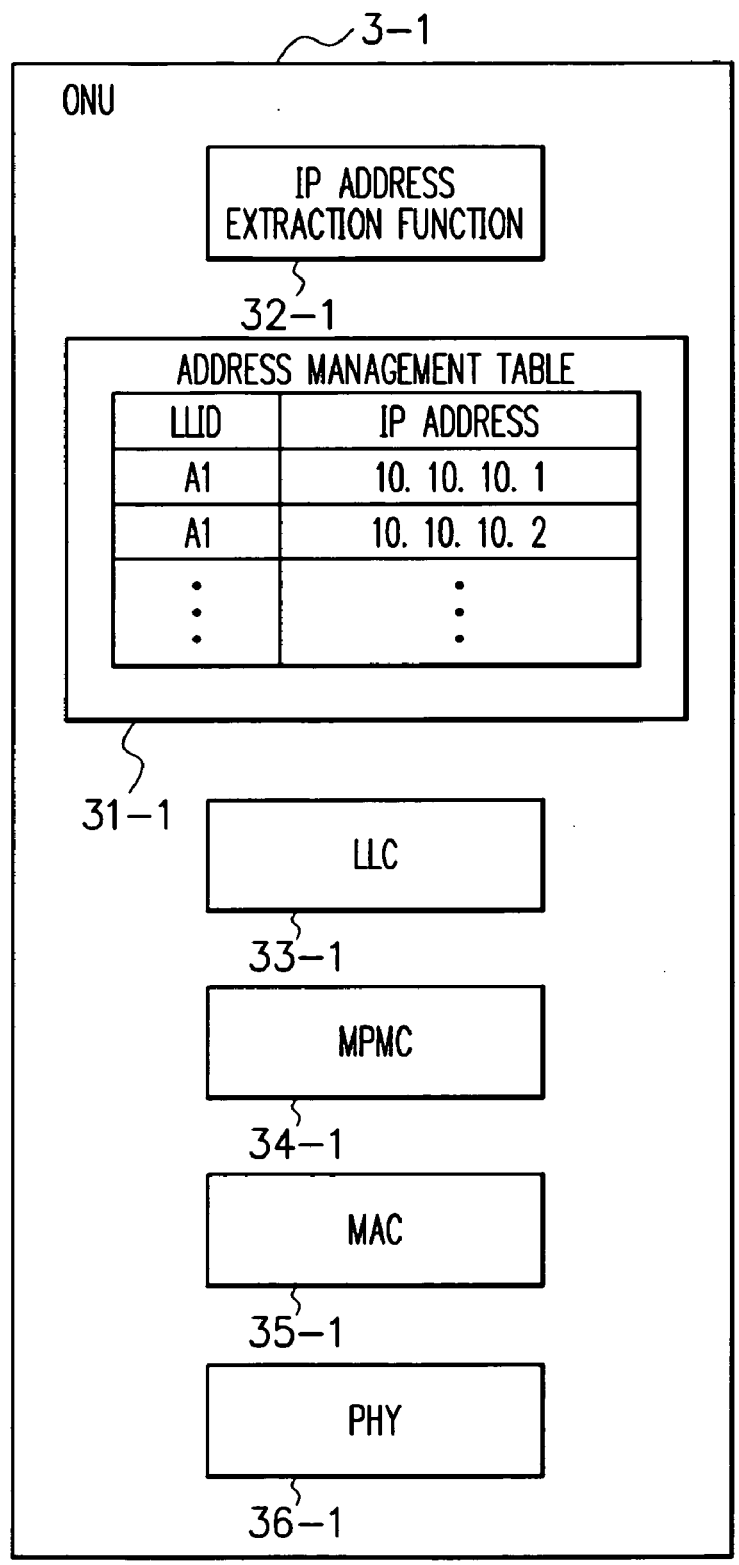
FIG. 4 is a diagram showing the structure of the address management table in the ONU 3-1 in FIG. 3.

FIG. 4 is a block diagram showing the structure of the ONU 3-1 in FIG. 3. Referring to FIG. 4, the ONU 3-1 comprises an address management table 31-1, an IP address extraction function 32-1, an LLC (Logical Link Control) 33-1, an MPMC (Multi Point MAC (Media Access Control) Control) 34-1, an MAC 35-1 and a PHY (Physical Layer device) 36-1.

An address management table 31-1 tabulates the correspondence between LLIDs (Logical Link Identifier) (A1, ... ) allocated peculiarly to the ONU 3-1 and IP addresses (10.10.10.1, 10.10.10.2, ... ) of the extraction result from the IP addresses transmitted from the IP telephone terminals 1-1 to 1-n.

The IP address extraction function 32-1 extracts the IP addresses from the IP packets transmitted from the IP telephone terminals 1-1 to 1-n. The LLC 33-1 performs logical link control between the OLT 7 and the ONU 3-1. The MPMC 34-1 performs multi point MAC control between the OLT 7 and a plurality of ONUs 3-1 to 3-n. Here, the MAC 35-1 and the PHY 36-1 are publicly known, and therefore an explanation thereof is omitted. Other ONUs 3-2 to 3-n (not shown in FIG. 4) have the same structure as the ONU 3-1 as above.

Figure 5:
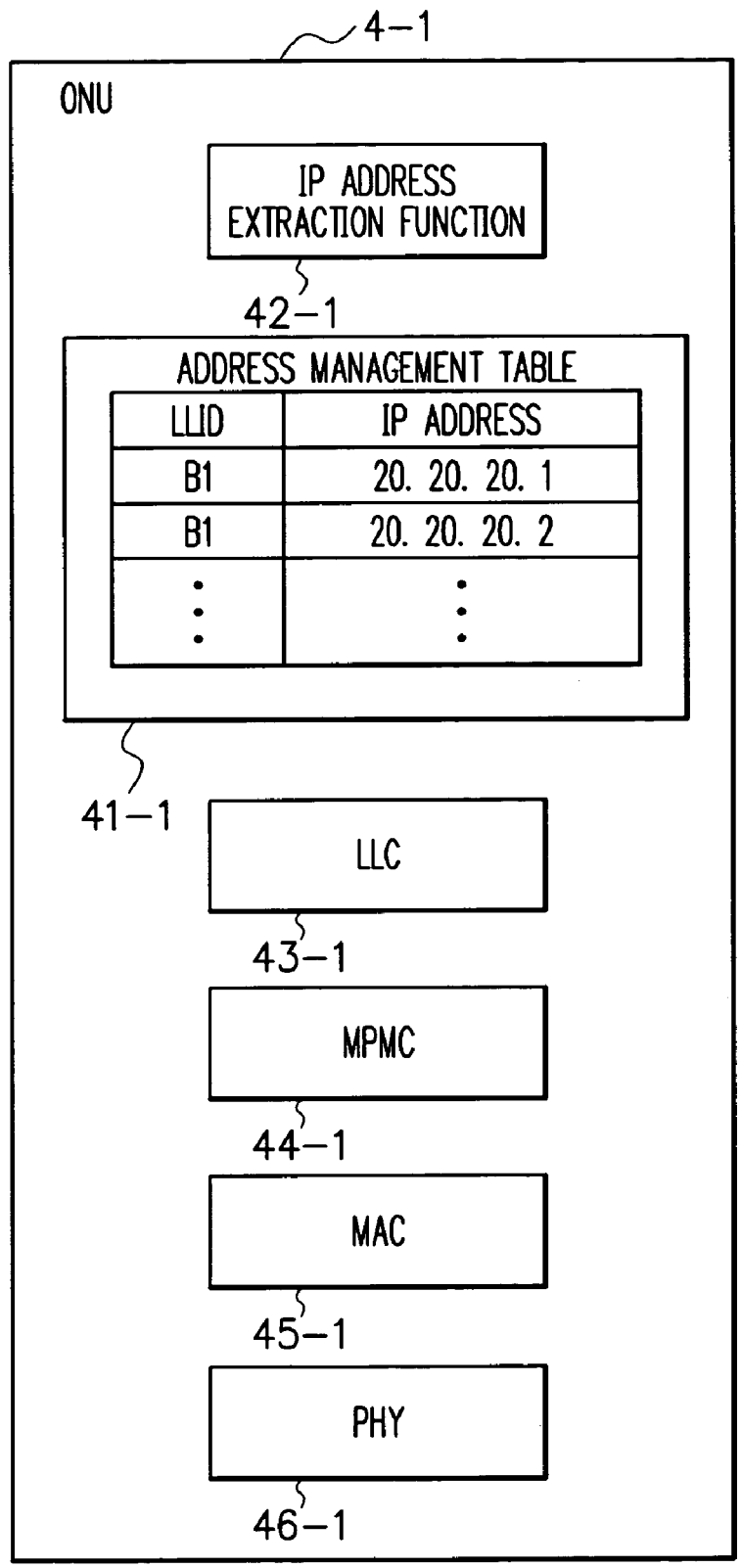
FIG. 5 is a diagram showing the structure of the address management table in the ONU 4-1 in FIG. 3.

FIG. 5 is a block diagram showing the structure of the ONU 4-1 shown in FIG. 3. Referring to FIG. 5, the ONU 4-1 comprises an address management table 41-1, an IP address extraction function 42-1, an LLC 43-1, an MPMC 44-1, an MAC 45-1 and a PHY 46-1.

The address management table 41-1 tabulates the correspondence between the LLIDs (B1, ... ) peculiarly allocated to the ONU 4-1 and IP addresses (20.20.20.1, 20.20.20.2, ... ) of the result of extraction from the IP addresses transmitted from the IP telephone terminals 2-1 to 2-n.

The IP address extraction function 42-1 extracts the IP addresses from the IP packets transmitted from the IP telephone terminals 2-1 to 2-n. The LLC 43-1 performs logical link control between the OLT 8 and the ONU 4-1. The MPMC 44-1 performs multi point MAC control between the OLT 8 and a plurality of ONUs 4-1 to 4-n. Here, the MAC 45-1 and the PHY 46-1 are publicly known, and therefore an explanation thereof is omitted. Other ONUs 4-2 to 4-n (not shown in FIG. 5) have the same structure as the ONU 4-1 as above.

FIG. 6 is a block diagram showing the structure of the OLT shown in FIG. 3. Referring to FIG. 6, the OLT 7 comprises an ID management table 71, an LLC 72, an MPMC 73, MACs 74-1 to 74-n corresponding to each ONU 3-1 to 3-n and each PHY 75-1 to 75-n.

The ID management table 71 tabulates the LLIDs (A1 to An) of the ONUs 3-1 to 3-n. The LLC 72 performs logical link control between the OLT 7 and the ONUs 3-1 to 3-n. The MPMC 73 performs multi point MAC control between the OLT 7 and a plurality of the ONUs 3-1 to 3-n. Here, the MACs 74-1 to 74-n and the PHYs 75-1 to 75n are publicly known, and therefore an explanation thereof is omitted. The other OLT 8 (not shown in FIG. 6) has the same structure as the OLT 7 as above.

Figure 7:
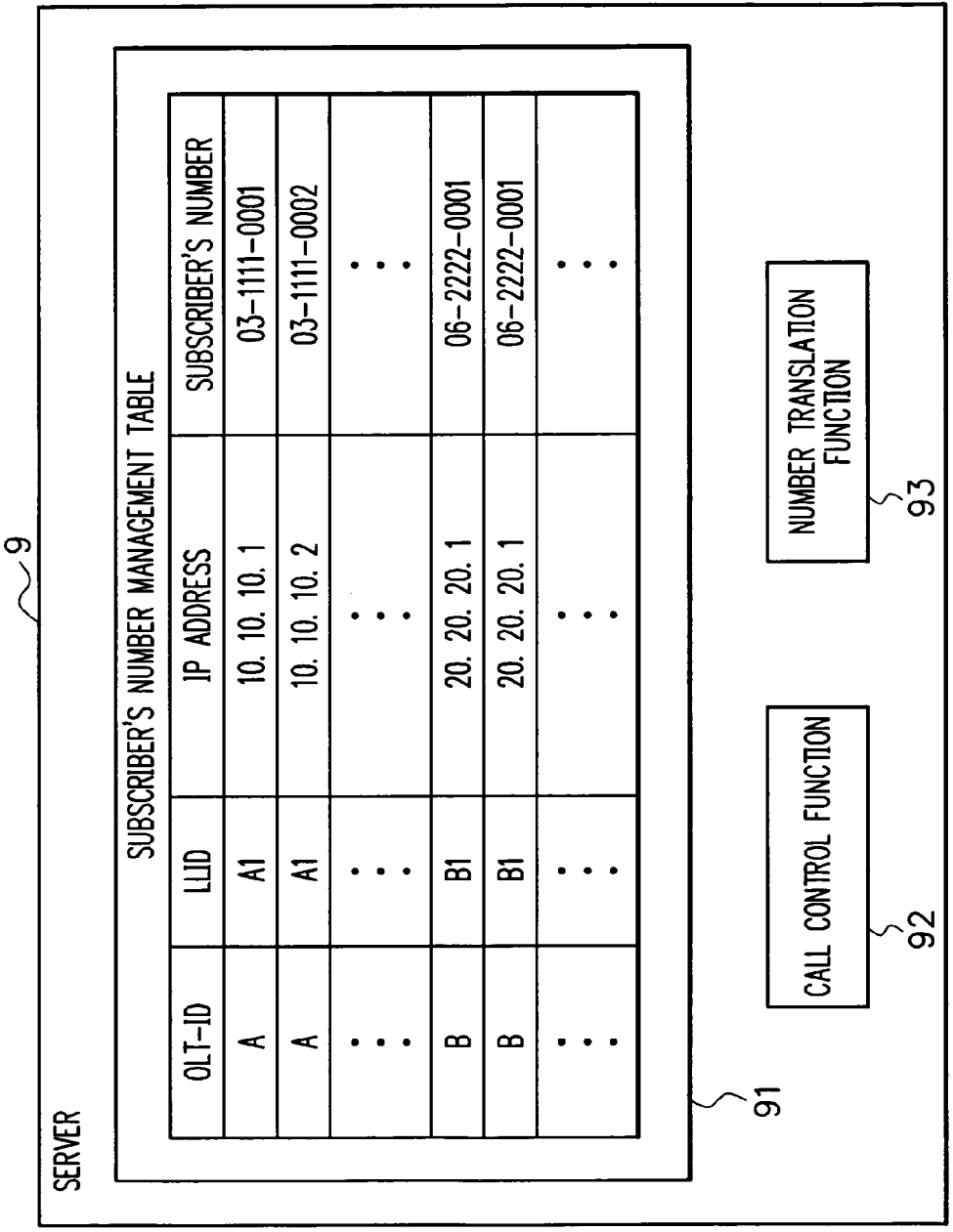
FIG. 7 is a diagram showing the structure of the subscriber's number management table in the server 9 in FIG. 3.

FIG. 7 is a block diagram showing the structure of the server 9 in FIG. 3. Referring to FIG. 7, the server 9 comprises a subscriber's number management table 91, a call control function 9 and a number translation function 93.

The subscriber's number management table 91 tabulates the correspondence among OLT-IDs (Optical Line Terminal Identifier) (A, B) allocated to the OLT 7 and 8 respectively, the LLIDs (A1, ..., B1, ... ) allocated to the ONUs 3-1 to 3-n and 4-1 to 4-n respectively, the IP addresses (10.10.10.1, 10.10.10.2, ..., 20.20.20.1, 20.20.20.2, ... ) allocated to the IP telephone terminals 1-1 to 1-n and 2-1 to 2-n respectively, and the subscriber's numbers (03-1111-0001, 03-1111-0002, ..., 06-2222-0001, 06-2222-0002, ... ).

The call control function 92 performs outgoing-incoming call control of the IP telephones 1-1 to 1-n and 2-1 to 2-n. The number translation function 93 translates the subscriber's number and the IP address based on the contents stored in the subscriber's number management table 91.

Figure 8:
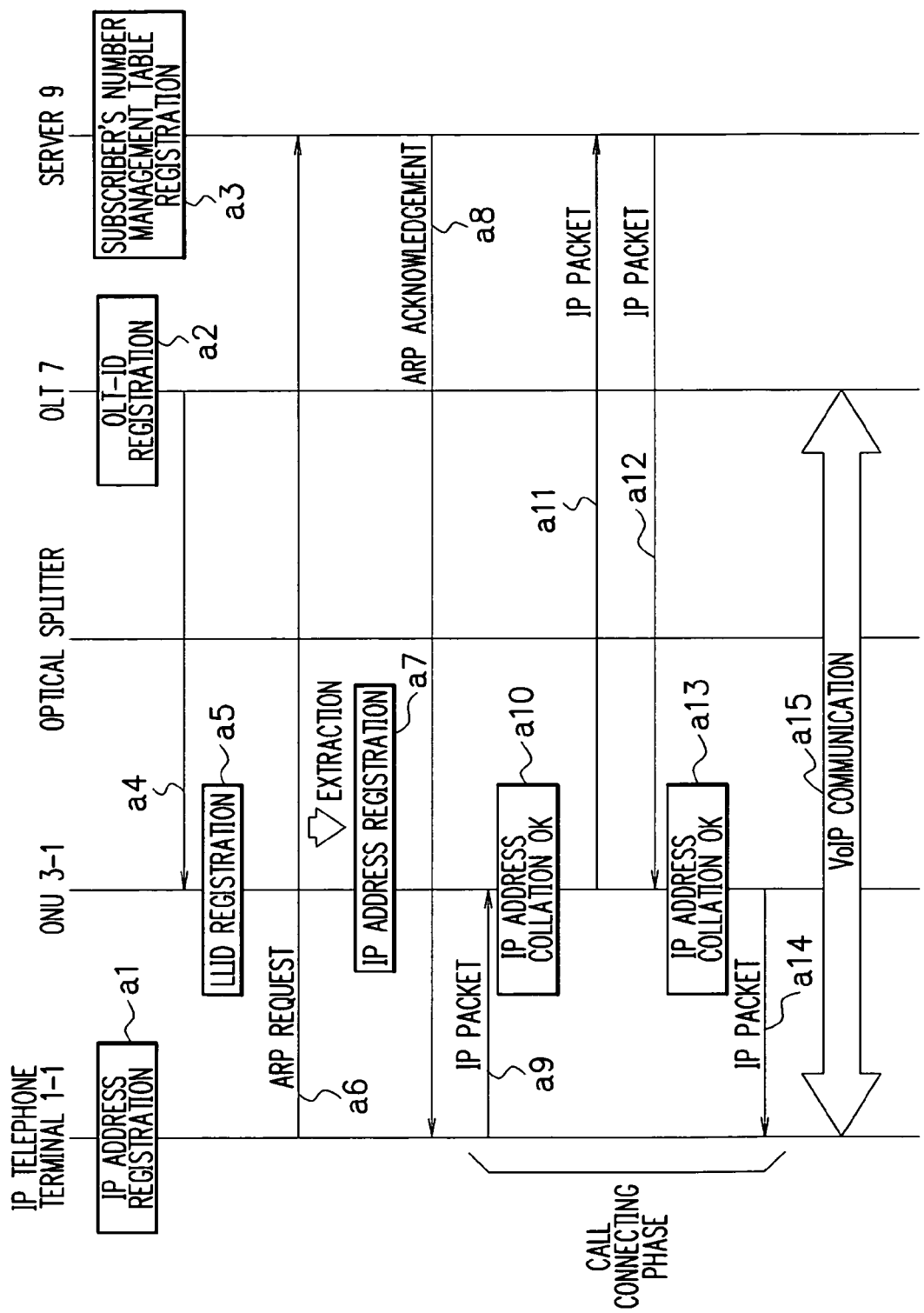
FIG. 8 is a sequence chart showing an operation of an IP telephone access system according to the first embodiment.

FIG. 8 is a diagram showing the operation of the IP telephone access system according to the first embodiment of the present invention. A description will be given of the IP telephone access system of this embodiment with reference to FIGS. 3 to 8.

The IP address distributed to the IP telephone terminal 1-1 is registered to the IP telephone terminal 1-1 (FIG. 8, a1). The OLT-ID corresponding to the OLT 7 is registered to the OLT 7 (FIG. 8, a2). The LLID corresponding to the ONU 3-1 is registered to the ONU 3-1 by the OLT 7 (FIG. 8, a4 and a5). The subscriber's number management table 91 coordinating the OLT-ID, the LLID, the IP address, and the subscriber's number is registered to the server 9 (FIG. 8, a3).

Next, before IP communication, the IP telephone terminal 1-1 issues an ARP (Address Resolution Protocol) request (FIG. 8, a6), and the server 9 acknowledges the ARP (FIG. 8, a8). The ARP request packet is extracted by the ONU 3-1, and then, the IP address of the IP telephone terminal 1-1 is registered to the address management table 31-1 of the ONU 3-1 (FIG. 8, a7).

When the IP telephone terminal 1-1 makes a call request, a call connecting phase starts. At this time, IP packets are transmitted and received between the IP telephone terminal 1-1 and the server 9. An example of each one packet for transmission and reception is shown in FIG. 8.

The ONU 3-1 collates a source IP address 10.10.10.1 1b of the IP packet transmitted from the IP telephone terminal 1-1 to the server 9 with the IP address 10.10.10.1 1b registered to the ONU 3-1, and then, if these IP addresses match, the IP packet is transferred to the server 9 (FIG. 8, a9 to a11).

Further, the ONU 3-1 collates a destination IP address 10.10.10.1 1b of the IP packet transmitted from the server 9 to the IP telephone terminal 1-1 with the IP address 10.10.10.1 1b registered to the ONU 3-1, and then, if these IP addresses match, the IP packet is transferred to the IP telephone terminal 1-1 (FIG. 8, a12 to a14).

When the call connecting phase has completed, VoIP (Voice over Internet Protocol) communication is established between the IP telephone terminal 1-1 and the OLT 7 (FIG. 8, a15).

Figure 9:
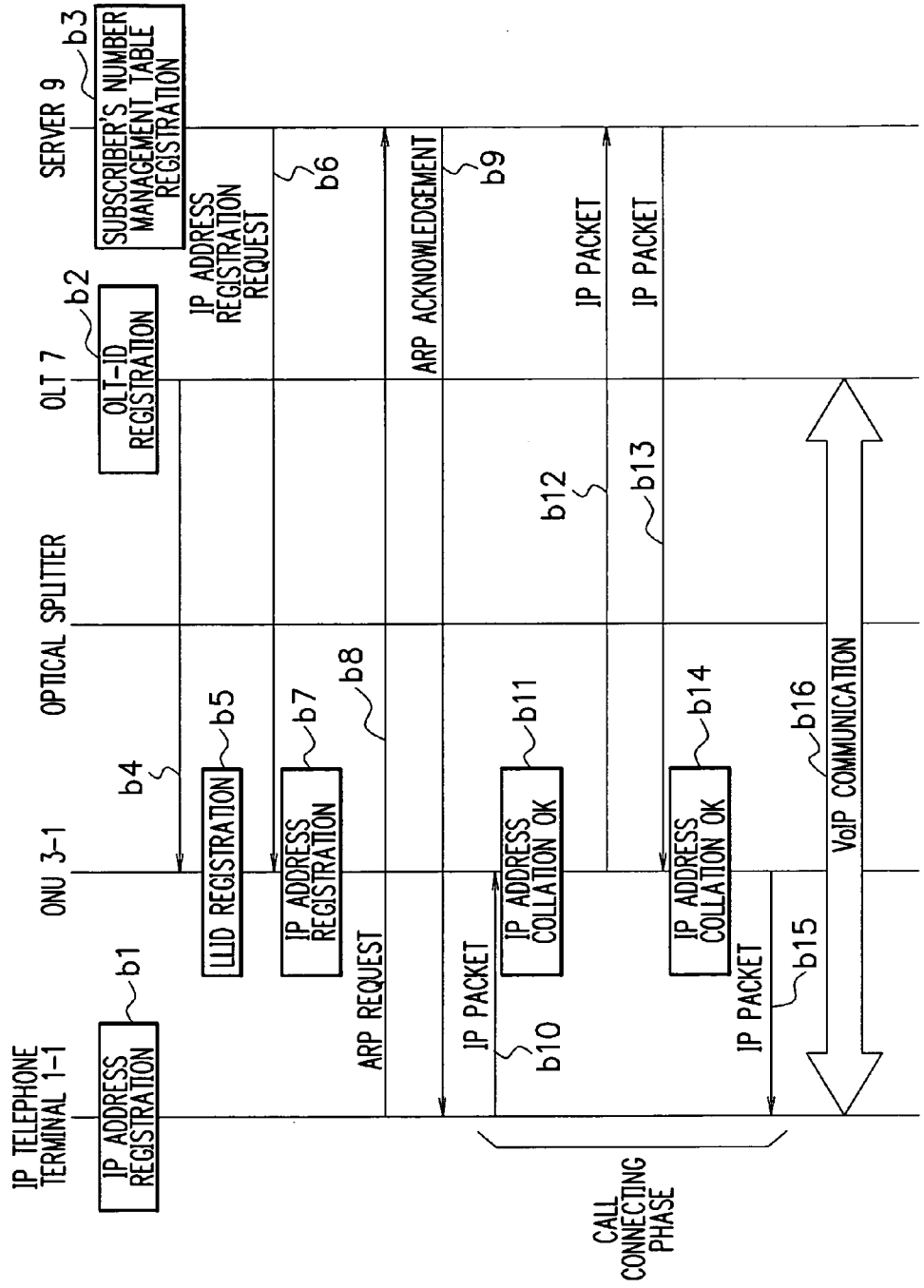
FIG. 9 is a sequence chart showing another operation of the IP telephone access system according to the first embodiment.

In the first embodiment, while the IP address of the IP telephone terminal 1-1 is extracted and registered to the address management table 31-1 in the ONU 3-1, it is also possible to perform the operation statically without extraction as shown in the sequence chart in FIG. 9.

The difference between FIGS. 9 and 8, instead of extracting the IP address when the IP telephone terminal 1-1 issues the ARP request, the server 9 transmits an IP address registration request to the ONU 3-1, and the server 9 informs the ONU 3-1 of the IP address of the IP telephone terminal 1-1 to register the IP address (FIG. 9, b6 and b7). Other sequences in FIG. 9 (b1 to b5, b8 to b16 in FIG. 9) are same as that of FIG. 8 (a1 to a6, a8 to a15 in FIG. 8).

Figure 10:
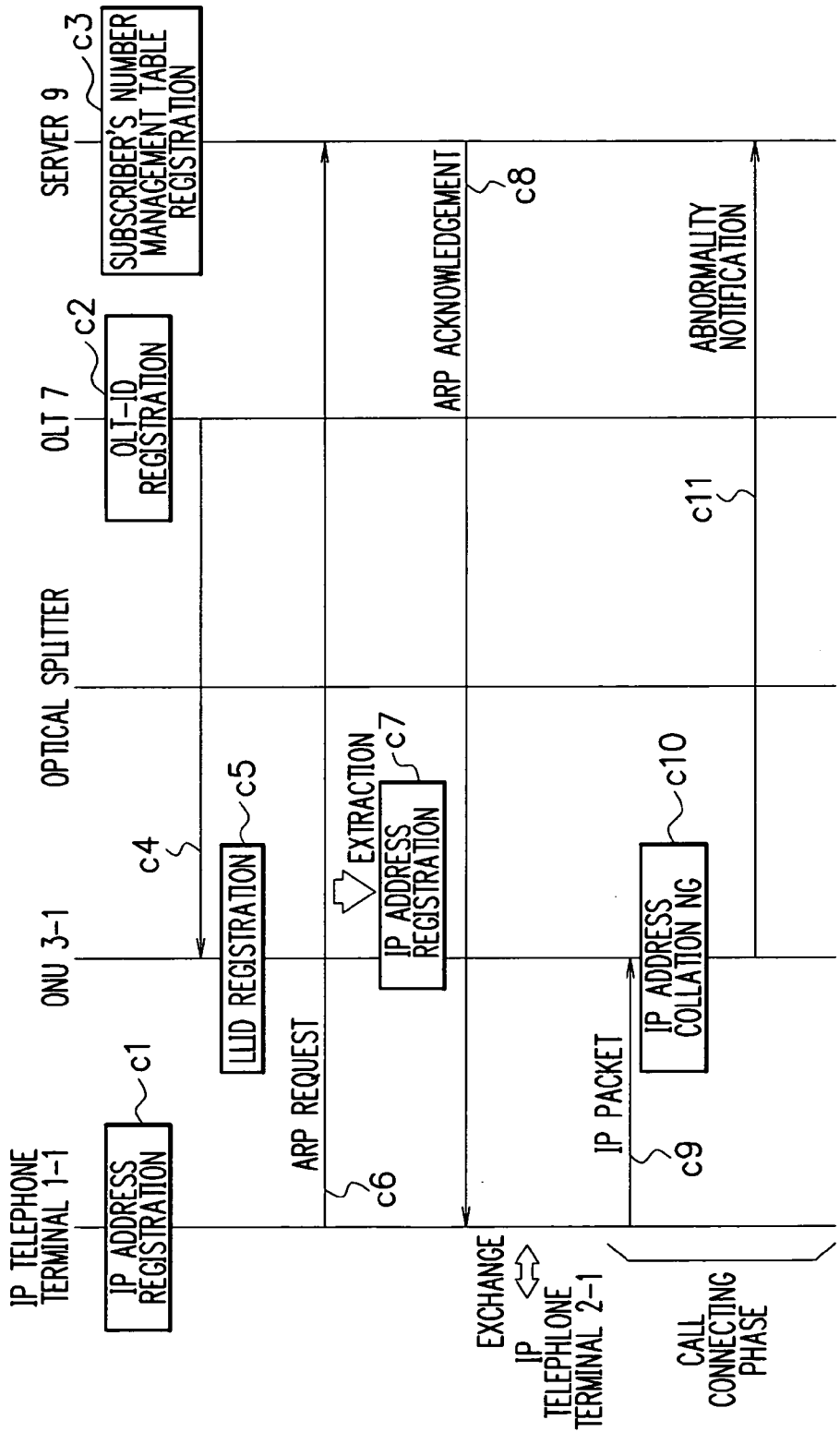
FIG. 10 is a sequence chart for explaining that communication is not established where after the IP address of the IP telephone terminal shown in FIG. 3 is registered to the ONU, another IP telephone terminal is moved to the place where the terminal has been installed and the IP telephone terminal is replaced with anther IP telephone terminal.

FIG. 10 is a sequence chart for explaining that, after registering the IP address of the IP telephone terminal 1-1 being 10.10.10.1 1b to the ONU 3-1 as shown in FIG. 3, the communication cannot be established when the IP telephone terminal 2-1 is moved to the place where the IP telephone terminal 1-1 has been installed and the IP telephone terminal 2-1 is replaced with the IP telephone terminal 1-1. A description will be given of the operation of this situation with reference to FIG. 10.

After the IP telephone terminal 2-1 and the IP telephone terminal 1-1 are exchanged, the call connecting phase starts, and when the IP packet is transmitted from the IP telephone terminal 2-1, a source IP address is monitored in the ONU 3-1, and then, the source IP address and the IP address of the address management table 31-1 are collated.

Here, because the IP address of the IP telephone terminal 2-1 being 20.20.20.1 2b is not registered to the address management table 31-1, the IP address is judged to be mismatched with the IP address in the address management table 31-1 in the ONU 3-1 (FIG. 10, c10), and an abnormality notification is transmitted to the server 9 (FIG. 10, c11). Hereby, the IP telephone terminal 2-1 cannot be used after being replaced.

Figure 11:
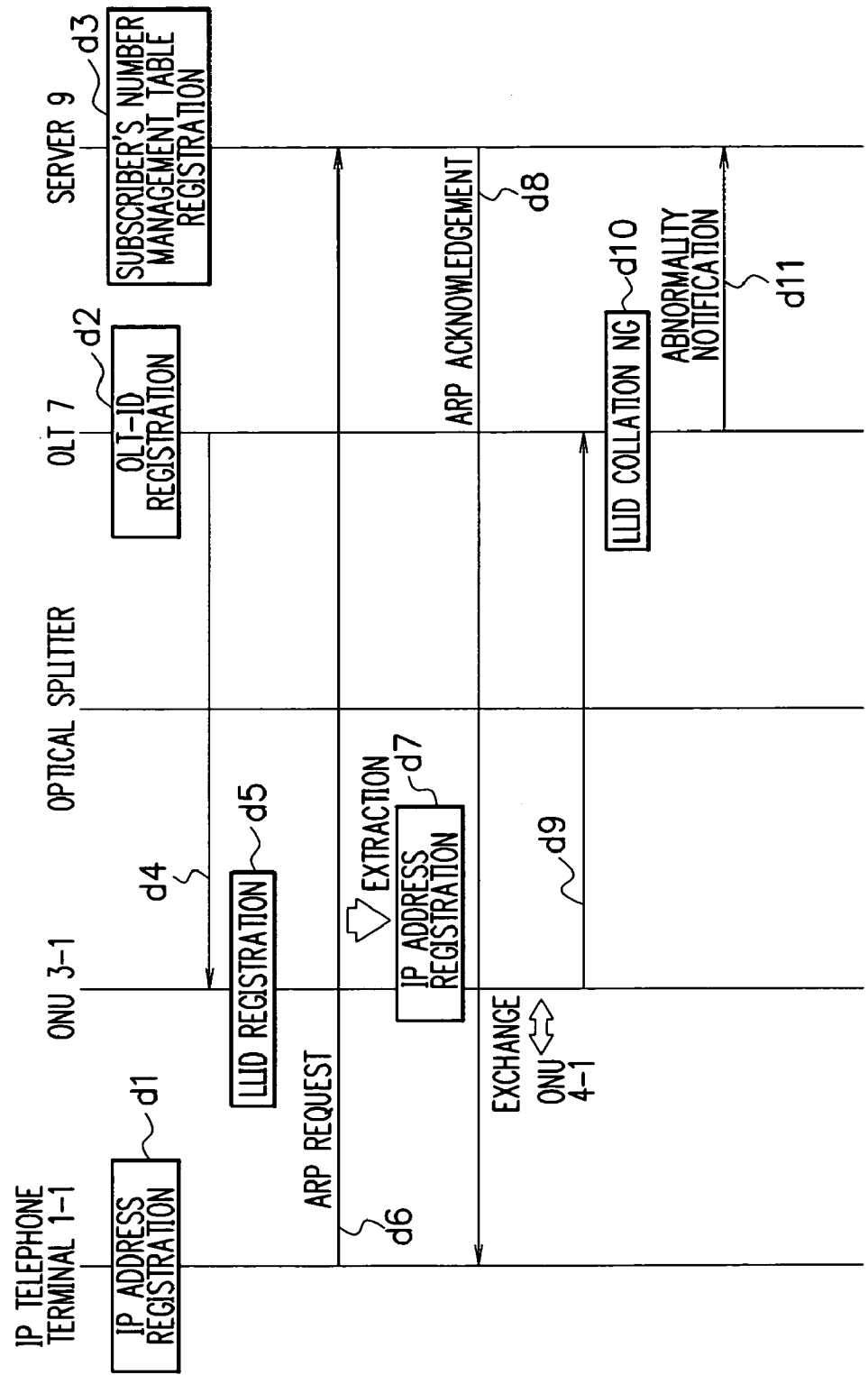
FIG. 11 is a sequence chart for explaining that communication is not established when the ONU 4-1 shown in FIG. 3 is moved to the place where the ONU 3-1 has been installed and the ONU 3-1 is exchanged for the ONU 4-1.

FIG. 11 is a sequence chart for explaining that the communication cannot be established when the ONU 4-1 is moved to the place where the ONU 3-1 has been installed and the ONU 3-1 is replaced with the ONU 4-1. A description will be given of the operation of this situation with reference to FIG. 9.

After the ONU 3-1 is exchanged for the ONU 4-1, the ONU 4-1 transmits the LLID registration contents to the OLT 7 (FIG. 11, d9). In the ID management table 71 in the OLT 7, while the LLID registration information of the ONU 3-1 is registered, the LLID registration information is not registered, and therefore, this situation is judged to be abnormal (LLID collation NG) (FIG. 11, d10) and the abnormality notification is transmitted to the server 9 (FIG. 11, d11). Hereby, the ONU 4-1 cannot be used after being replaced.

Figure 12:
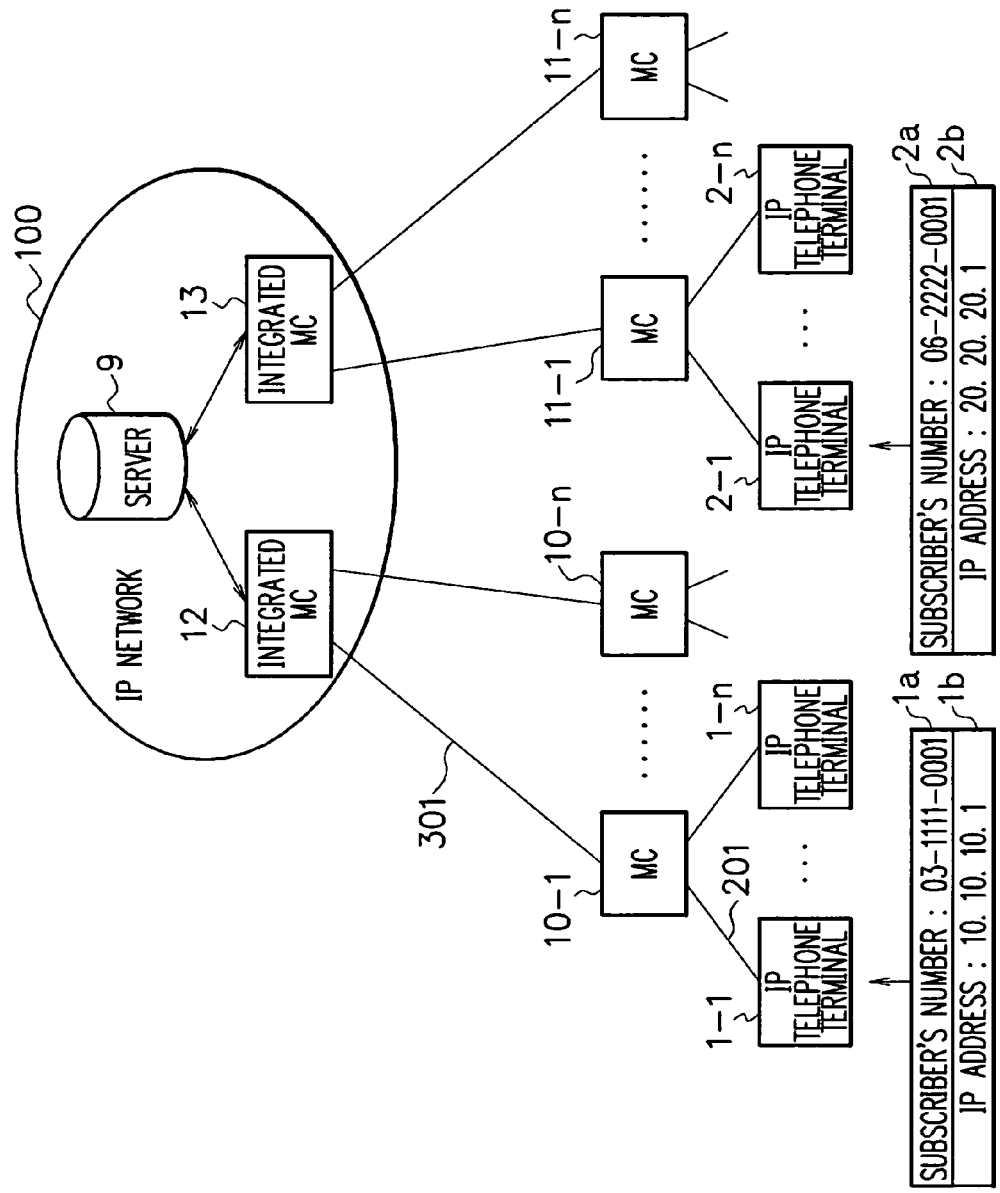
FIG. 12 is a block diagram showing the structure of an IP telephone access system according to the second embodiment of the present invention.

FIG. 12 is a block diagram showing the structure of the IP telephone access system according to the second embodiment of the present invention. Referring to FIG. 12, the IP telephone access system of this embodiment comprises the IP telephone terminals 1-1 to 1-n and 2-1 to 2-n, MCs (Media Converter) 10-1 to 10-n and 11-1 to 11-n, integrated MCs 12 and 13, and the server 9. Incidentally, the integrated MCs 12 and 13 and the server 9 form the IP network 100.

In this embodiment, while the basic structure is the same as that of the first embodiment of the present invention, the IP telephone access system of the second embodiment does not employ the PON structure being a PDS (Passive Double Star) system but an MC structure being an SS (Single Star) system. A description will be given of the point of difference of this MC structure from the PON structure.

The MC 10-1 converts optical signals from an optical cable 301 and electric signals from the UTP cable 201. The integrated MC 12 includes the MCs 10-1 to 10-n. The integrated MC 12 and the MCs 10-1 to 10-n are connected by the SS system.

Figure 13:
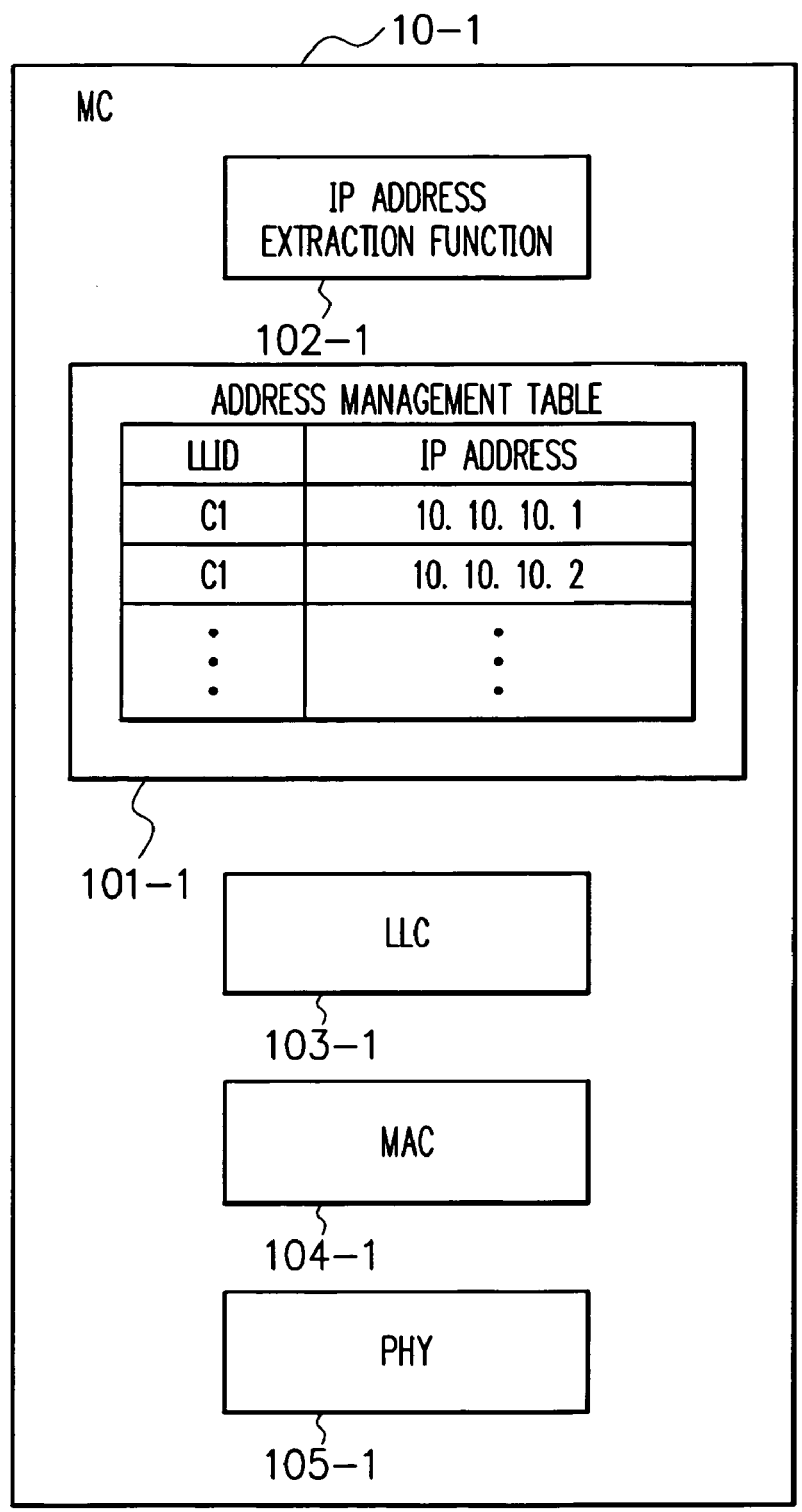
FIG. 13 is a block diagram showing the structure of the MC 10-1 in FIG. 12.

FIG. 13 is a block diagram showing the structure of the MC 10-1 in FIG. 12. Referring to FIG. 13, the MC 10-1 comprises an address management table 101-1, an IP address extraction function 102-1, an LLC 103-1, an MAC 104-1, and a PHY 105-1.

The address management table 101-1 tabulates the correspondence between the LLIDs (C1, . . . ) peculiarly allocated to the MC 10-1, and the IP addresses (10.10.10.1, 10.10.10.2, . . . ) of the result of extraction of the IP addresses transmitted from the IP telephone terminals 1-1 to 1-n.

The IP address extraction function 102-1 extracts the IP addresses transmitted from the IP telephone terminals 1-1 to 1-n. The LLC 103-1 performs logical link control between the integrated MC 12 and the MC 10-1. Here, the MAC 104-1 and the PHY 105-1 are publicly known, and therefore an explanation thereof is omitted. Other MCs 10-2 to 10-n (not shown in FIG. 13) have the same structure as the MC 10-1.

Figure 14:
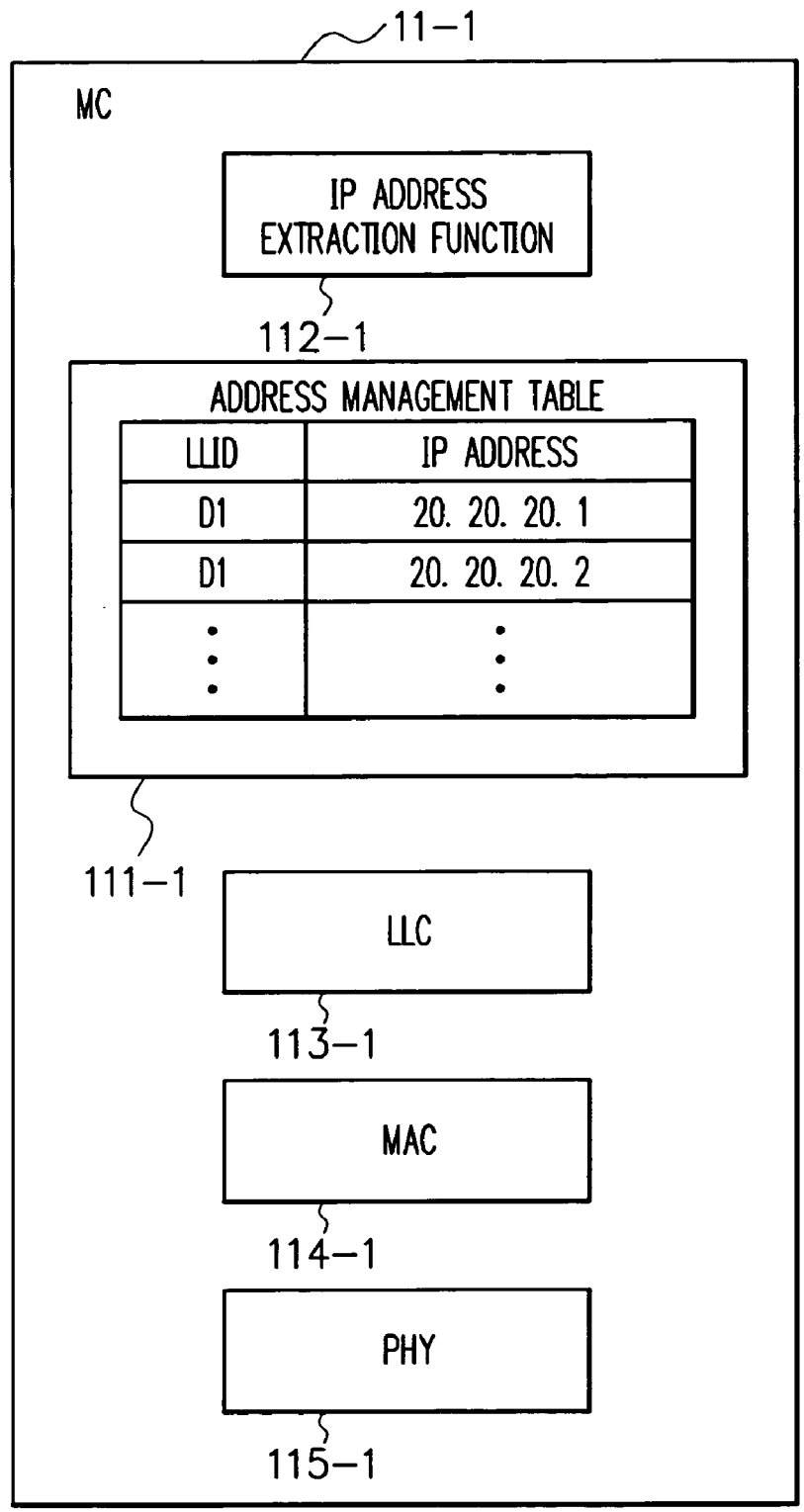
FIG. 14 is a block diagram showing the structure of the MC 11-1 in FIG. 12.

FIG. 14 is a block diagram showing the structure of the MC 11-1 in FIG. 12. Referring to FIG. 14, the MC 11-1 comprises an address management table 111-1, an IP address extraction function 112-1, an LLC 113-1, an MAC 114-1 and a PHY 115-1.

The address management table 111-1 tabulates the correspondence of the LLIDs (D1, . . . ) peculiarly allocated to the MC 11-1 and the IP addresses (20.20.20.1, 20.20.20.2 . . . ) of the result of extraction of the IP addresses transmitted from the IP telephone terminals 2-1 to 2-n.

The IP address extraction function 112-1 extracts the IP addresses from the IP packets transmitted from the IP telephone terminals 2-1 to 2-n. The LLC 113-1 performs logical link control between the integrated MC 13 and the MC 11-1. Here, the MAC 114-1 and the PHY 115-1 are publicly known, and therefore an explanation thereof is omitted. Other MCs 11-2 to 11-n (not shown in FIG. 14) have the same structure as the MC 11-1.

FIG. 15 is a block diagram showing the structure of the integrated MC 12 in FIG. 12. Referring to FIG. 15, the integrated MC 12 comprises an ID management table 121, an LLC 122, MACs 123-1 to 123-n and PHYs 124-1 to 124-n.

The ID management table 121 tabulates the LLIDs (C1 to Cn) of the MCs 10-1 to 10-n. The LLC 122 performs the logical link control between the integrated MC 12 and the MCs 10-1 to 10-n. Here, the MACs 123-1 to 123-n and the PHYs 124-1 to 124-n are publicly known, and therefore an explanation thereof is omitted. The other integrated MC 13 (not shown in FIG. 15) has the same structure as the integrated MC 12.

FIG. 16 is a sequence chart of the operation of the IP telephone access system according to the second embodiment. A description will be given of the operation of the IP telephone access system of this embodiment with reference to FIGS. 12 to 16. Incidentally, the server 9 has the same structure as that of the first embodiment of the present invention, except employing an integrated MC-ID for specifying the integrated MCs 12 and 13 instead of the OLT-ID, and therefore the explanation and the graphic display of the structure of the server 9 are omitted here.

The IP address peculiarly distributed to the IP telephone terminal 1-1 is registered to the IP telephone terminal 1-1 (FIG. 16, e1). The integrated MC-ID corresponding to the integrated MC 12 is registered to the integrated MC 12 (FIG. 16, e2). The LLID corresponding to the MC 10-1 is registered to the MC 10-1 from the integrated MC 12 (FIG. 16, e4 and e5). The subscriber's number management table 91 coordinating the integrated MC-ID, the LLID, the IP address, and the subscriber's number is registered to the server 9 (FIG. 16, e3).

Next, before IP communication, the IP telephone terminal 1-1 issues the ARP request (FIG. 16, e6), and the server 9 acknowledges the ARP (FIG. 16, e8). The ARP request packet is extracted by the MC-10-1, and then, the IP address of the IP telephone terminal 1-1 is registered to the address management table 101-1 of the MC 10-1 (FIG. 16, e7).

When the IP telephone terminal 1-1 makes a call request, a call connecting phase starts. At this time, the IP packets are transmitted and received between the IP telephone terminal 1-1 and the server 9. As an example, each one packet for transmission and reception is shown in FIG. 16.

The MC 10-1 collates a source IP address 10.10.10.1 1b of the IP packet transmitted from the IP telephone terminal 1-1 to the server 9 with the IP address 10.10.10.1 1b registered to the MC 10-1, and then, if these IP addresses match, the IP packet is transferred to the server 9 (FIG. 16, e9 to e11).

Further, the MC 10-1 collates a destination IP address of the IP packet transmitted from the server 9 to the IP telephone terminal 1-1 being 10.10.10.1 1b with the IP address registered to the MC 10-1 being 10.10.10.1 1b, and then, if these IP addresses match, the IP packet is transferred to the IP telephone terminal 1-1 (FIG. 16, e12 to e14). When the call connecting phase has completed, VoIP communication is established between the IP telephone terminal 1-1 and the integrated MC 12 (FIG. 16, e15).

In the second embodiment, while the IP address of the IP telephone terminal 1-1 is extracted and registered to the address management table 31-1 in the MC 10-1, it is also possible to perform the operation statically without extraction as shown in the sequence chart in FIG. 9.

As is the case with the above described PON structure, after the IP address of the IP telephone terminal 1-1 being 10.10.10.1 1b is registered to the MC 10-1, when the IP telephone terminal 2-1 is moved to the place where the IP telephone terminal 1-1 has been installed and the IP telephone terminal 1-1 is replaced with the IP telephone terminal 2-1, the communication cannot be established. Further, when the MC 11-1 is replaced to the place where the MC 10-1 is to exchange the MC 10-1 for the MC 11-1, the communication cannot be established.

As above, even when the IP telephone access system of this embodiment employs the MC structure, the effect is the same as that of the first embodiment. In the embodiments described above, while the IP address is expressed by an IPv4 (Internet Protocol version 4) format, an IPv6 (Internet Protocol version 6) may also be applied to the embodiments.

According to the present invention, the IP addresses of the IP telephone terminals 1-1 to 1-$n$ and 2-1 to 2-$n$ are registered by being extracted in the ONUs 3-1 to 3-$n$ and 4-1 to 4-$n$ or the MCs 10-1 to 10-$n$ and 11-1 to 11-$n$. Thus, it is possible to prevent the use of the telephone number of a fixed telephone (0AB-J number) beyond the geographically identified area because the IP address which is not registered is received by the ONUs 3-1 to 3-$n$ and 4-1 to 4-$n$ or the MCs 10-1 to 10-$n$ and 11-1 to 11-$n$ to transmit the abnormality notification to the server 9 when the IP telephone is replaced beyond the geographically identified area.

Further, according to the present invention, it is possible to prevent the use of the telephone number of a fixed telephone (0AB-J number) beyond the geographically identified area because the LLID which is not registered is detected by the OLTs 7 and 8, or the integrated MCs 12 and 13 to transmit the abnormality notification to the server 9 when the ONUs 3-1 to 3-$n$ and 4-1 to 4-$n$ or the MCs 10-1 to 10-$n$ and 11-1 to 11-$n$ are replaced beyond the geographically identified area.

Moreover, according to the present invention, because the exchange or the MGC is not necessary, the transfer from the existing fixed telephone (analog telephone, ISDN telephone) to the IP telephone without changing the subscriber's number is carried out economically, and also the IP telephone access system is easily operated.

While a description is given of the present invention using the optical network, the IP telephone access system of the present invention may also be applied to an ADSL (Asymmetric Digital Subscriber Line), an ISDN or the like.

While preferred embodiments of the invention have been described using specific terms, the description has been for illustrative purpose only, and it is to be understood that changes and variations may be made without departing from the spirit or scope of the following claims.

What is claimed is:

1. An IP telephone access system which includes an IP telephone terminal, a customer's terminating device connected to the IP telephone terminal, and an intra-office terminating device connected to the customer's terminating device, comprising:
    an address management table, in the customer's terminating device, for coordinating a logical link identifier of each customer's terminating device and an IP address of the IP telephone terminal;
    an ID management table, in the intra-office terminating device, for registering the logical link identifier of each customer's terminating device connected to the intra-office terminating device;
    a server, in an IP network in which information between the IP telephone terminal and the server is transferred by IP packets, accessible from the intra-office terminating device; and
    a subscriber's number management table, in the server, for coordinating the identifier of the intra-office terminating device, the logical link identifier of the customer's terminating device, the IP address of the IP telephone terminal and the subscriber's number;
    wherein a source IP address in a call request packet transmitted from the IP telephone terminal is collated in the customer's terminating device to determine whether or not the source IP address is a match with any one of IP addresses stored in the address management table, and only the call request packet transmitted from the IP telephone terminal whose IP address is stored in the address management table is accepted.

2. The IP telephone access system claimed in claim 1, wherein the customer's terminating device includes IP address extraction means for extracting the IP address contained in an ARP (Address Resolution Protocol) request issued by the IP telephone terminal to register the IP address to the address management table.

3. The IP telephone access system claimed in claim 1, wherein the customer's terminating device registers the IP address of the IP telephone terminal to the address management table based on information notified from the server.

4. The IP telephone access system claimed in claim 2, including a optical splitter for branching optical signals from the intra-office terminating device to the customer's terminating device and gathering optical signals from the customer's terminating device to the intra-office terminating device.

5. The IP telephone access system claimed in claim 4, wherein the customer's terminating device is an ONU (Optical Network Unit) and the intra-office terminating device is an OLT (Optical Line Terminal).

6. An IP telephone access system which includes an IP telephone terminal, a media converter (MC) connected to the IP telephone terminal and an integrated MC connected to the MC, comprising:
    an address management table, in the MC, for coordinating a logical link identifier of each MC and an IP address of the IP telephone terminal;
    an ID management table, in the integrated MC, for registering the logical link identifier of each MC connected to the integrated MC;
    a server, in an IP network in which information between the IP telephone terminal and the server is transferred by IP packets, accessible from the integrated MC; and
    a subscriber's number management table, in the server, for coordinating the identifier of the integrated MC, the logical link identifier of the MC, the IP address of the IP telephone terminal and the subscriber's number;
    wherein a source IP address in a call request packet transmitted from the IP telephone terminal is collated in the MC to determine whether or not the source IP address is a match with any one of IP addresses stored in the address management table, and only the call request packet transmitted from the IP telephone terminal whose IP address is stored in the address management table is accepted.

7. The IP telephone access system claimed in claim 6, wherein the MC includes IP address extraction means for extracting the IP address contained in an APP (Address Resolution Protocol) request issued by the IP telephone terminal to register the IP address to the address management table.

8. The IP telephone access system claimed in claim 6, wherein the MC registers the IP address of the IP telephone terminal to the address management table based on information notified from the server.

9. A customer's terminating device connected to at least one IP telephone terminal for forming an IP telephone access system together with an intra-office terminating device at an entrance of an IP network in which a server is located to perform communication control for the IP telephone terminal, the customer's terminating device comprising:
   an address management table coordinating a logical link identifier of its own and an IP address of the IP telephone terminal;
   IP address extraction means for extracting a source IP address contained in a call request packet transmitted from the IP telephone terminal which requests communication control to the server; and
   means for collating to determine whether or not the source IP address is a match with any one of IP addresses stored in the address management table, and only the call request packet transmitted from the IP telephone terminal whose IP address is stored in the address management table is accepted.

10. The customer's terminating device claimed in claim 9, wherein the IP address extraction means extracts the IP address contained in an ARP (Address Resolution Protocol) request, issued by the IP telephone terminal to register the IP address to the address management table.

11. The customer's terminating device claimed in claim 9, wherein the IP address of the IP telephone terminal is registered to the address management table based on information notified from the server.

12. The customer's terminating device claimed in claim 9, being an Optical Network Unit (ONU), wherein the intra-office terminating device is an Optical Line Terminal (OLT).

13. The customer's terminating device claimed in claim 9, being a media converter (MC), wherein the intra-office terminating device is an integrated media converter (IMC) which forms the IP telephone access system together with the MC.

14. An IP telephone access method applied to the system which includes an IP telephone terminal, a customer's terminating device connected to the IP telephone terminal, an intra-office terminating device connected to the customer's terminating device, comprising:
   coordinating, using information provided in an address management table, in the customer's terminating device, a logical link identifier of each customer's terminating device and an IP address of the IP telephone terminal;
   registering, in an ID management table, in the intra-office terminating device, the logical link identifier included in the customer's terminating device connected to the intra-office terminating device;
   coordinating, using a subscriber's management table the identifier in the intra-office terminating device, the logical link identifier in the customer's terminating device, the IP address of the IP telephone terminal and the subscriber's number in a server accessible from the intra-office terminating device and located in the IP network transferring information by IP packets between the IP telephone terminal and the server;
   collating a source IP address in a call request packet transmitted from the IP telephone terminal in the customer's terminating device to determine whether or not the source IP address is a match with any one of IP addresses stored in the address management table; and
   accepting only the call request packet transmitted from the IP telephone terminal whose IP address is stored in the address management table.

15. The IP telephone access method claimed in claim 14, wherein said first step further comprising:
   extracting the IP address contained in an ARP (Address Resolution Protocol) request issued by the IP telephone terminal to register the IP address to the address management table.

16. The IP telephone access method claimed in claim 14, wherein, said first step further comprising:
   registering the IP address to the address management table based on information notified from the server.

17. The IP telephone access method claimed in claim 15, including an optical splitter for branching optical signals from the intra-office terminating device to the customer's terminating device and gathering optical signals from the customer's terminating device to the intra-office terminating device.

18. The IP telephone access method claimed in claim 17, wherein the customer's terminating device is an Optical Network Unit (ONU) and the intra-office terminating device is an Optical Line Terminal (OLT).

19. An IP telephone access method applied to a system which comprises an IP telephone terminal and a media converter (MC) connected to the IP telephone terminal and an integrated MC connected to the MC, comprising:
   coordinating, using information provided in an address management table, in the MC, a logical link identifier of each MC and an IP address of the IP telephone terminal;
   registering, in an ID management table, in the integrated MC, the logical link identifier of the MC connected to the integrated MC;
   coordinating, using a subscriber's management table the identifier of the integrated MC, the logical link identifier in the MC, the IP address of the IP telephone terminal and the subscriber's number in a server accessible from the integrated MC and located in the IP network transferring information by IP packets between the IP telephone terminal and the server;
   collating a source IP address in a call request packet transmitted from the IP telephone terminal in the MC to determine whether or not the source IP address is a match with any one of IP addresses stored in the address management table; and
   accepting only the call request packet transmitted from the IP telephone terminal whose IP address is stored in the address management table.

20. The IP telephone access method claimed in claim 19, wherein said first step further comprising:
   extracting the IP address contained in an ARP (Address Resolution Protocol) request issued by the IP telephone terminal to register the IP address to the address management table.

21. The IP telephone access method claimed in claim 19, wherein said first step further comprising:

registering the IP address to the address management table based on information notified from the server.

22. The IP telephone access system claimed in claim 1, wherein the subscriber's number management table coordinates the identifier of the intra-office terminating device, the logical link identifier of the customer's terminating device, the IP address of the IP telephone terminal and the subscriber's number by storing the intra-office terminating device, the logical link identifier of the customer's terminating device, the IP address of the IP telephone terminal and the subscriber's number as a plurality of data entries in which each of the data entries corresponds to a set of four fields of data respectively corresponding to the intra-office terminating device, the logical link identifier of the customer's terminating device, the IP address of the IP telephone terminal and the subscriber's number.

23. The IP telephone access method claimed in claim 14, further comprising:
    storing the intra-office terminating device, the logical link identifier of the customer's terminating device, the IP address of the IP telephone terminal and the subscriber's number as a plurality of data entries in the subscriber's management table, in which each of the data entries corresponds to a set of four fields of data respectively corresponding to the intra-office terminating device, the logical link identifier of the customer's terminating device, the IP address of the IP telephone terminal and the subscriber's number.

24. The IP telephone access system claimed in claim 1, wherein, when the logical link identifier of the customer's terminating device which is not registered in the ID management table is detected in the intra-office terminating device, the intra-office terminating device transmits an abnormality notification to the server.

25. The IP telephone access method claimed in claim 14, further comprising:
    detecting the logical link identifier of the customer's terminating device in the intra-office terminating device, and transmitting an abnormality notification to the server when the logical link identifier not registered in the ID management table is detected.

* * * * *